United States Patent [19]

Ting et al.

[11] Patent Number: 5,783,235
[45] Date of Patent: Jul. 21, 1998

[54] METHOD OF PREPARING A FULL HOP FLAVORED BEVERAGE OF LOW BITTERNESS

[75] Inventors: Patrick L. Ting, Brookfield; Hetvin A. Wilkinson, Wauwatosa, both of Wis.; David S. Ryder, Libertyville, Ill.; Matthew L. Tripp, Nashotah, Wis.; Sydney Rader, Fredonia, Wis.; Henry Goldstein, Brookfield, Wis.

[73] Assignee: Miller Brewing Company, Milwaukee, Wis.

[21] Appl. No.: 641,130

[22] Filed: Apr. 30, 1996

Related U.S. Application Data

[63] Continuation-in-part of Ser. No. 218,559, Mar. 28, 1994, abandoned.

[51] Int. Cl.$^6$ .............................. C12C 3/08; C12C 11/00
[52] U.S. Cl. ............................... 426/16; 426/29; 426/600
[58] Field of Search ............................ 426/16, 29, 600

[56] References Cited

U.S. PATENT DOCUMENTS

| | | | |
|---|---|---|---|
| 3,044,879 | 7/1962 | Koch et al. | 99/50.5 |
| 3,552,975 | 1/1971 | Worden et al. | 99/50.5 |
| 3,787,499 | 1/1974 | Grant | 260/586 |
| 4,344,978 | 8/1982 | Sharpe et al. | 426/600 |
| 4,389,421 | 6/1983 | Palamand | 426/330.4 |
| 4,759,941 | 7/1988 | Chicoye et al. | 426/600 |
| 4,778,691 | 10/1988 | Todd, Jr. et al. | 426/600 |
| 5,073,396 | 12/1991 | Todd, Jr. et al. | 426/592 |
| 5,120,557 | 6/1992 | Owades | 426/330.3 |

FOREIGN PATENT DOCUMENTS 753555Q  12/1970  Belgium.

OTHER PUBLICATIONS

SU 1601–112A Publication and Translation.
SU 1622385A Publication (Translation Only).

*Primary Examiner*—Cynthia L. Nessler
*Assistant Examiner*—Curtis E. Sherrer
*Attorney, Agent, or Firm*—Quarles & Brady

[57] ABSTRACT

A method of making a light stable, hop flavored, fermented beverage of less bitterness having a comparable hop flavor to one prepared using whole hops consists of adding to a wort as the sole hopping material a solid hop residue obtained by extracting whole hops with liquid carbon dioxide, boiling the solid hop residue and wort mixture, removing the solids from the fermented mixture and fermenting the remaining liquid to obtain the beverage.

1 Claim, No Drawings

METHOD OF PREPARING A FULL HOP FLAVORED BEVERAGE OF LOW BITTERNESS

RELATED CASE

This application is a continuation-in-part of our U.S. patent application Ser. No. 08/218,559 filed Mar. 28, 1994, now abandoned.

FIELD OF THE INVENTION

The present invention generally relates to hop flavored beverages. More particularly, it relates to a novel method of preparing a full hop flavored, fermented beverage of low bitterness and compositions for use in adding a hop flavor to fermented beverages.

BACKGROUND OF THE INVENTION

Hops, in the form of either the ground dried plant or pellets, are used in brewing to give the beverages, such as beer or ale, their characteristic bitter flavor and pleasant aroma. The hops usually are added to the boiling wort in the brewing kettle. Alternatively, if only a bitter taste is desired, no whole hops is used and a hop extract is added to the brewing kettle or an isomerized hop extract, if it is highly purified, may be added post kettle, i.e., after the wort has been boiled or after fermentation.

The primary constituents of whole hops which are utilized in the brewing process are the alpha acids, the beta acids, the uncharacterized resins and the hop oils. The alpha acids are known as humulones and the beta acids are known as lupulones. The alpha acids are the precursors of the bitter substances in beer. The beta acids have low solubility in wort and beer and they are believed to play a relatively minor role in the brewing process.

During brewing, chemical changes are made in the alpha acids resulting in the formation of compounds known as iso-alpha acids, i.e., isohumulone, isocohumulone and isoadhumulone. The alpha acids are extracted from the hops by the boiling wort and isomerized to the iso-alpha acids during the kettle boiling stage.

It is known that iso-alpha acids derived from hops or an unreduced hop extract which contains the iso-alpha acids can cause light instability in malt beverages. The exposure of such a beer or ale to light can result in the beverage becoming "light struck" and having a skunky odor. As a result, such beverages cannot be packaged in clear or green glass bottles without a risk of developing the "light struck" character.

Hop extracts have been used to add a hop flavor and bitterness to beer for a number of years. The reasons are severalfold. When whole hops are added to the kettle, the yield of iso-alpha acids is poor, e.g., 20–25% based on the alpha acids present in the hops. However, the conversion of alpha acids in a hop extract to iso-alpha acids can be very high, e.g. 80%. Furthermore, the utilization of the pure iso-alpha acids in a preisomerized extract which is added post kettle is known to be extremely high, e.g. 70–90%.

The hop extracts are produced from whole hops by the use of either organic solvents, such as alcohols, chlorinated hydrocarbons, low boiling petroleum solvent, or by the use of carbon dioxide. The solid hop residue which remains after the hop extracts have been prepared from whole hops are generally referred to as "spent hops". The addition of solid hop residue or "spent hops" along with a $CO_2$ hop extract to wort to make beer is described in the 1990 Russian Patent No. 1,601,112. However, using the combination of spent hops and $CO_2$ hop extract does not provide any economical advantage over using whole hops. In addition, the use of spent hops in making a non-hop flavored unfermented beverage is described in the Owades U.S. Pat. No. 4,765,993. Those skilled in the art generally consider spent hops to be a waste product to be discarded or sold as animal feed.

We have discovered that one disadvantage of adding hop extracts to the wort in the kettle is that the beer produced lacks the full flavor and aroma produced when whole hops are added to the wort in the kettle. As a result, fermented beverages, such as beer, which have been prepared using hop extracts, although they may have the bitterness of beverages prepared from whole hops, do not have the same full hop flavor as fermented beverages made with whole hops. However, the use of whole hops to obtain the full hop flavor results in a very bitter tasting beverage which may not be desired.

It would be advantageous to have a method of preparing less bitter, fermented beverages having the same "full hop flavor" as fermented beverages prepared with the use of whole hops. The "full hop flavor" is the aroma or flavor which is not present in the hops or wort, but which is in the finished beer after fermentation.

SUMMARY OF THE INVENTION

It is the primary object of the present invention to disclose a method of preparing a hop flavored, fermented beverage which has the full hop flavor of a fermented beverage prepared from whole hops, but which is less bitter than the beverage made using whole hops.

It is a further object to disclose a method for preparing such a hop flavored, fermented beverage using the solid hop residue which is a by-product of the hop-extraction process.

It is a further object to disclose novel kettle hopping compositions.

It is a still further object to disclose novel full hop flavored, fermented beverages prepared by the method of the present invention.

We have discovered that the solid hop residue remaining after the extraction of whole hops with carbon dioxide can be used as the sole hopping material, to prepare a novel fermented beverage having a full hop flavor and little bitterness.

The method of the present invention for making a fermented beverage having the full hop flavor of a beverage prepared from whole hops, but with less bitterness, consists of adding to the wort in the brewing kettle, prior to or during boiling, as the sole hop additive an effective amount of a solid hop residue made from whole hops from which the bittering components have been extracted with carbon dioxide, boiling the mixture of wort and the solid hop residue to extract from the residue into the wort the hop flavor and aroma contributing components, removing the solids from the mixture, and then fermenting the remaining liquid containing the wort and the extract of the solid hop residue with yeast to obtain a full hop flavored, fermented beverage having less bitterness than a similar beverage made using whole hops.

Important advantages of the method of the present invention are that it makes possible the preparation of a previously unavailable, less bitter, full hop flavored, fermented beverage, using an inexpensive by-product.

We also have discovered novel compositions which also can be added to give a beverage a fermented, full hop flavored beverage with less bitterness.

One novel composition consists of an aqueous extract of solid hop residue and the residue of the hop extract which remains after the alpha acids are removed from the hop extract. This residue of the hop extract is sometimes referred to as the "hop character fraction" or "HCF". This composition can be added to the brew kettle after the wort has been boiled, but before fermentation.

A second novel composition comprises an extract containing hop flavor and aroma contributing components which is made by boiling a mixture of wort and a solid hop residue obtained by extracting whole hops with carbon dioxide. This composition can be added to the brew kettle after the wort has been boiled, but before fermentation.

Still other novel compositions comprise the compositions obtained by fermenting with yeast the first and second compositions described above. They can be added post kettle to beverages which have already been fermented.

DESCRIPTION OF THE PREFERRED EMBODIMENTS

In one preferred embodiment of the method of the present invention, the solid hop residue, which remains after a hop extract containing alpha acids has been obtained from whole hops by liquid carbon dioxide ($CO_2$) extraction, and the hop character fraction (HCF), which is the residue of a hop extract which remains after the alpha acids have been removed from the hop extract obtained by liquid carbon dioxide extraction, are pelletized. The pellets containing the solid hop residue and the HCF are then added in an effective amount to a wort in a brewing kettle, prior to or during, the boiling of the wort. The mixture is then boiled and fermented with yeast to bioconvert the hop components and the wort. The solids are then separated to obtain a liquid beverage which has the full hop flavor of a beverage made with whole hops, but less bitterness.

In another preferred embodiment, pellets of the solid hop residue by itself are used in place of the pellets containing the solid hop residue and HCF in the above method.

A beverage having the same full hop flavor as a fermented beverage made with whole hops cannot be made by simply using the solid hop residue. It is essential that the wort containing the solid hop residue components be fermented with yeast to bioconvert the mixture of wort and solid hop residue components in order to obtain the desired full hop flavor.

To determine the scope and effectiveness of the present invention, experimental work was performed in which Cascade hop pellets were exhaustively extracted with liquid $CO_2$ as described in U.S. Pat. No. 4,344,978. The resulting $CO_2$ extract, the solid hop residue, α-acids, β-acids, and HCF were then used to make beer. As a result, it was found that the beer made with solid hop residue had a full hop flavor comparable to a beer made with whole hops, but that it was substantially less bitter. The tests also confirmed that the beer made with the solid hop residue was light stable and could be packaged in clear white (flint glass) or green bottles.

The following is a brief description of the experimental tests performed and the materials employed.

EXAMPLE 1

Brews were conducted in a pilot plant with the hopping materials shown in Table 1. All the hopping materials were added to an unhopped brewery wort 45 min. before the completion of boiling (knock-out), the wort was then boiled and fermented with yeast to produce beer. The amounts of hopping materials to be added were calculated based on the bitterness values (BU) of alpha acids they contained. The amounts of the hopping materials that did not contain alpha acids were added in amounts roughly equivalent to the amounts of alpha acids originally in the pellets.

TABLE 1

Descriptions of Pilot Plant Brewed Beers

| Pilot. Brew No. | Hopping Material | Addition Rate |
|---|---|---|
| 1 | Pellets | 1200 mg/L |
| 2 | $CO_2$ Extract | 200 mg/L |
| 3 | Super$CO_2$ Extract | 200 mg/L |
| 4 | β-Rich Fraction | 166 mg/L |
| 5 | HCF | 166 mg/L |
| 6 | Solid Hop Residue | 1200 mg/L |
| 7 | Caustic Extract | 1200 mg/L |

Sensory evaluations were performed on the Pilot Brews by a taste panel. The QDA procedure is described in detail in McCredy, J. M. et al, Food Technology, 28, 36–41 (1974).

The panel found that the Pilot Brew No. 6 (made with solid hop residue) had a moderate fermented hop aroma, a fermented hop taste and low bitterness.

The test results indicated that the solid hop residue, a by-product from the $CO_2$ extraction of hops, used alone or blended with HCF produced a beer having a hop flavor comparable to a beer that was produced from whole hop pellets, but with less bitterness.

EXAMPLE 2

Hop Flavors and Light Stability of Pilot Beers Brewed with Reconstructed Hop Pellets Five types of reconstructed hop pellets were prepared by blending solid hop residue with water and various calculated amounts of a $CO_2$ hop extract, α-acids from the extract, hop character fraction (HCF) and β-acids from the extract and forming the mixtures into pellets using a pelletizer. Each hop component was added according to the amounts originally present in the pellets.

1. Solid Hop Residue+$CO_2$ extract
2. Solid Hop Residue+α-acids
3. Solid Hop Residue+β-acids
4. Solid Hop Residue+HCF
5. Solid Hop Residue (SHR)

The Pilot Brews shown in Table 2 were prepared using the procedure described in Example 1.

TABLE 2

| Pilot Brew No. | Addition Rate of Reconstructed Hop Pellets to Brewery Wort |
|---|---|
| 8 | SHR (2.25 g/L) + $CO_2$ Extract (0.4 g/L) |
| 9 | SHR (2.25 g/L) + α-Acids (0.175 g/L) |
| 10 | SHR (2.25 g/L) + HCF (0.065 g/L) |
| 11 | SHR (2.25 g/L) |
| 12 | SHR (2.25 g/L) + β-Acids (0.248 g/L) |
| 13 | Hop Pellets (1.5 g/L) |

All the beers were targeted for 20 BU. The hopping materials which did not contain alpha acids were added in amounts equivalent to the amounts that would have been used if there were alpha acids present in the pellets. Some beers did not achieve 20 BU and were adjusted with tetrahydro iso-alpha acids to the desired BU.

Hop Flavor Evaluation

Pilot Brews 8 through 12 were each evaluated with the control pilot brew (No. 13) and a beer produced with no kettle hopping (NKH). Samples were rated on aroma strength, fruity/estery character, hop character and bitterness. The results are shown in Tables 3 to 7. The following significant differences were found:

(a) Solid Hop Residue+$CO_2$ Extract (Pilot Brew No. 8) had more hop character than the control (No. 13). It also had more aroma strength, fruity/estery character, hop character and bitterness than the NKH beer.

(b) Solid Hop Residue+Alpha Acids (Pilot Brew No. 9) was not significantly different in the four attributes than the control beer (No. 13). Pilot Brew No. 9 had more aroma strength, fruity/estery character, hop character and bitterness than the NKH beer.

(c) Solid Hop Residue+HCF (Pilot Brew No. 10) was not significantly different in the four attributes than the control beer (No. 13). Pilot Brew No. 10 had more aroma strength, fruity/estery character and hop character than the NKH beer.

(d) Solid Hop Residue Only (Pilot Brew No. 11) was less bitter, but not significantly different in aroma strength, fruity/estery character and hop character than the control beer. Pilot Brew No. 11 had more aroma strength, fruity/estery character and hop flavor than the NKH beer.

(e) Solid Hop Residue+Beta Acids (Pilot Brew No. 12) had more hop character than the control beer (No. 13). Pilot Brew No. 12 had more aroma strength, fruity/estery character and hop character than the NKH beer.

TABLE 3

| Characteristic | Mean* P.B. No. 8 | P.B. No. 13 | NKH | F-Value | Level of Significance |
|---|---|---|---|---|---|
| Aroma Strength | 15.4$^a$ | 13.6$^{ab}$ | 12.7$^b$ | 3.52 | 95.0% |
| Fruity/Estery | 12.8$^a$ | 11.1$^a$ | 8.4$^b$ | 9.12 | 99.9% |
| Hop Character | 14.0$^a$ | 11.1$^b$ | 7.2$^c$ | 16.47 | 99.9% |
| Bitterness | 13.3$^a$ | 13.3$^a$ | 10.6$^b$ | 4.68 | 95.0% |

N = 20
Comments: P.B. No. 8 - grapefruit - 3 panelists
*Mean scores sharing a common letter are not significantly different at the 95% level.

TABLE 4

| Characteristic | Mean* P.B. No. 9 | P.B. No. 13 | NKH | F-Value | Level of Significance |
|---|---|---|---|---|---|
| Aroma Strength | 13.3$^a$ | 12.7$^{ab}$ | 11.6$^b$ | 4.27 | 95.0% |
| Fruity/Estery | 11.2$^a$ | 10.5$^a$ | 8.3$^b$ | 8.81 | 99.9% |
| Hop Character | 11.2$^a$ | 11.1$^a$ | 8.6$^b$ | 6.73 | 99.0% |
| Bitterness | 13.0$^a$ | 12.9$^a$ | 10.6$^b$ | 7.18 | 99.9% |

N = 37
Comments: P.B. No. 9 - grapefruit - 2 panelists
*Mean scores sharing a common letter are not significantly different at the 95% level.

TABLE 5

| Characteristic | Mean* P.B. No. 10 | P.B. No. 13 | NKH | F-Value | Level of Significance |
|---|---|---|---|---|---|
| Aroma Strength | 12.8$^a$ | 11.9$^{ab}$ | 10.9$^b$ | 3.02 | 95.0% |
| Fruity/Estery | 10.6$^a$ | 9.5$^a$ | 7.3$^b$ | 7.77 | 99.9% |
| Hop Character | 11.3$^a$ | 10.6$^a$ | 8.0$^b$ | 7.89 | 99.9% |
| Bitterness | 11.2$^{ab}$ | 12.8$^a$ | 10.2$^b$ | 4.30 | 95.0% |

N = 25
Comments: P.B. No. 10 - grapefruit/citrus - 5 panelists
*Mean scores sharing a common letter are not significantly different at the 95% level.

TABLE 6

| Characteristic | Mean* P.B. No. 11 | P.B. No. 13 | NKH | F-Value | Level of Significance |
|---|---|---|---|---|---|
| Aroma Strength | 13.4$^a$ | 12.9$^{ab}$ | 11.8$^b$ | 3.68 | 95.0% |
| Fruity/Estery | 12.2$^a$ | 11.0$^a$ | 8.0$^b$ | 10.51 | 99.9% |
| Hop Character | 11.0$^a$ | 10.5$^a$ | 8.2$^b$ | 5.31 | 99.0% |
| Bitterness | 11.3$^{ab}$ | 12.5$^a$ | 10.5$^b$ | 3.05 | 95.0% |

N = 25
Comments:
P.B. No. 11 - grapefruit/citrus - 6 panelists
P.B. No. 13 - green hop/dry hop - 2 panelists
*Mean scores sharing a common letter are not significantly different at the 95% level.

TABLE 7

| Characteristic | Mean* P.B. No. 12 | P.B. No. 13 | NKH | F-Value | Level of Significance |
|---|---|---|---|---|---|
| Aroma Strength | 13.8$^a$ | 12.2$^{ab}$ | 11.8$^b$ | 3.72 | 95.0% |
| Fruity/Estery | 11.1$^a$ | 9.6$^{ab}$ | 8.2$^b$ | 3.64 | 95.0% |
| Hop Character | 12.5$^a$ | 9.9$^b$ | 8.9$^b$ | 7.08 | 99.0% |
| Bitterness | 11.3$^{ab}$ | 12.3$^a$ | 10.3$^b$ | 3.19 | 95.0% |

N = 20
*Mean scores sharing a common letter are not significantly different at the 95% level.

The Pilot Brews No. 10, No. 11 and No. 13 also were evaluated against a control which was a beer produced with no kettle hopping (NKH) by a round table panel.

An eight member round table panel were asked to describe the differences in hop aroma and hop flavor. The results are reported in Table 8.

The panel found the (NKH) control to have the least aroma, low hop aroma and low bitterness. The pilot brew formulated with Solid Hop Residue and HCF (Pilot Brew No. 10) was found to have the most aroma and hop aroma. It was described as the fruitiest of the four products with a pineapple/grapefruit character and a moderate bitterness. The pilot brew formulated with Solid Hop Residue (P.B. No. 11) and the pilot brew formulated with Cascade hop pellets (P.B. No. 13) both had a moderate hop character. However, P.B. No. 11 was less bitter than P.B. No. 13.

TABLE 8

Round Table Results

| Control | Spent Hops + HCF P.B. No. 10 | Spent Hops P.B. No. 11 | Hop Pellets P.B. No. 13 |
|---|---|---|---|
| least aroma | most aroma most fruity pineapple/grapefruit | grapefruit/ citrus | grapefruit/ citrus |
| low hop aroma | most hop aroma | moderate hop aroma | moderate hop aroma |
| low bitterness | moderate bitterness | moderately strong bitterness | moderately strong bitterness |

Light Stability Evaluation

A 10-day light stability test on the above beers was conducted by a taste panel (6 people). The samples packaged in sealed clear bottles were placed in open low-side six pack carriers and set under 25 foot-candles of fluorescent light. At the end of a 10-day period, the samples were evaluated for the degree of light struck character.

Pilot Brew Nos. 10 and 11 did not produce the light struck character while Pilot Brew Nos. 8, 9, and 13 produced significant amounts of light struck character. However, Pilot Brew No. 12 gave a slight light struck character which might be due to residual amounts of alpha acids present in the beta acids.

CONCLUSIONS

The foregoing test results indicate that there was essentially no hop flavor difference between the beer made from solid hop residue by the method of the present invention and the beer made with whole hops. The beer made by the practice of the present invention also had acceptable taste and foam characteristics, as well as light stability. Thus, it is possible by the practice of the method of the present invention to prepare a light stable, full hop flavored beer with less bitterness.

It will be apparent to those skilled in the art that the method of the present invention, in addition to being novel and useful, is also simple and economical. For example, only conventional brewing techniques and equipment are used and the hopping material is a previously described by-product of the $CO_2$ extraction.

The solid hop residues preferred for use in the method of the present invention are those obtained after the exhaustive liquid carbon dioxide extraction of the alpha acids from whole hops under 40° to 80° F. and 500–1000 psig. The liquid carbon dioxide extraction of hops is described in U.S. Pat. No. 4,344,978. Other solid hop residues that can be used are those obtained by the extraction of hops with supercritical $CO_2$ at a temperature of 100°–150° F. and pressure of 1100–3000 psig., or by the practice of the extraction methods of U.S. Pat. Nos. 3,448,326, 3,798,332, and 4,002,683 and others.

Representative of the different types of hops that can be used to prepare the hop extract and solid hop residue are the preferred Cascade hops and Galena hops. However, other varieties of hops also can be used.

The material used as the hop character fraction (HCF) is either that described in U.S. Pat. No. 4,844,939 or preferably one that also contains beta acids.

The amount of solid hop residue to be added depends upon the amount of flavoring desired in the resulting beverage. Normally, if solid hop residue is used alone the amount employed will be about 1× to 3× or more than the amount of whole hops that would have been employed to obtain the same flavor whole hopped beer. When the preferred composition containing both solid hop residue and HCF are used the amount employed can be less and normally will be about 0.5× to about 3× or more of the amount of whole hops that would be employed.

It will be apparent to those skilled in the art that a number of modifications and changes may be made without departing from the spirit and scope of the invention. Therefore it is to be understood that the invention is not to be limited by the description and examples but only by the claims which follow:

We claim:

1. A method of preparing a fermented, hop flavored beverage having the same hop flavor but less bitterness than an otherwise identical beverage made with whole hops, consists of adding to a wort, prior to or during boiling, as the sole hopping material, a solid hop residue obtained by extracting whole hops with carbon dioxide; boiling the resulting wort and solid hop residue mixture to extract the hop flavor and aroma contributing components; removing solids from the mixture to obtain a remaining liquid; and then fermenting the remaining liquid with yeast to bioconvert hop flavor and aroma contributing components from the solid hop residue and the wort to obtain the desired full hop flavored beverage.

* * * * *